United States Patent Office 3,323,603
Patented June 6, 1967

3,323,603
DRILLING FLUID CONTAINING ACRYLIC ACID-ACRYLAMIDE COPOLYMER AND METHOD OF DRILLING THEREWITH
James L. Lummus and Duane B. Anderson, Tulsa, Okla., assignors to Pan American Petroleum Corporation, Tulsa, Okla., a corporation of Delaware
No Drawing. Filed Nov. 12, 1964, Ser. No. 410,534
9 Claims. (Cl. 175—65)

ABSTRACT OF THE DISCLOSURE

A drilling fluid contains from about 1 to about 3 percent by weight sodium bentonite, and not more than about 3 percent by weight other clays. An acrylate-acrylamide copolymer is used in a concentration from about 0.005 to about 0.15 pound per barrel to beneficiate the bentonite and flocculate other clays. The acrylate to acrylamide ratio is from about 12 to 88 to about 70 to 30. By increasing the calcium ion to a concentration above about 500 parts per million, the bentonite can also be flocculated to permit clear water drilling.

---

This application is a continuation-in-part of our co-pending U.S. patent application Ser. No. 329,568, entitled Low Solids Drilling Fluid, filed on Dec. 10, 1963, and now abandoned.

This invention relates to low solids drilling fluids. More particularly it relates to an additive for giving a drilling fluid some of the properties of a high solids mud while having a drilling rate close to the high rate which is attainable with water.

In U.S. Patent 3,070,543 to Scott, use of a vinyl-maleic copolymer to form such a drilling fluid is described. A calcium salt of a vinyl acetate-maleic anhydride copolymer described in the Scott patent has enjoyed considerable commercial success because it not only beneficiates bentonite, but at the same time flocculates other clays, thus maintaining a low colloidal solids content in the drilling fluid. As noted in the Scott patent, one of the most important functions of the flocculating action is to prevent dispersion of bit cuttings into the drilling fluid. As a result of this action, the shale and clay particles are removed from the drilling fluid on the shale shaker and in the settling pits or tanks rather than increasing the content of collaoidal size patricles in the drilling fluid. This in turn allows much higher drilling rates since it is these particles dispersed in the colloidal range which seem to be principally responsible for decreased drilling rates.

In addition to the increase drilling rate, it has also been found that the lower solids content increases bit life. In many cases this can be the principal benefit. There are two principal results of increased bit life. First, less bits are required, which decreases bit costs. Second, it is unnecessary to make so many trips out of and into the well to change bits, so a higher percentage of rig time can be spent with the bit on the bottom of the well, drilling. This second result means that the number of days required to drill a well is greatly reduced. All this is shown in the drawing. This drawing is taken from an article New Type of Mud Reduces Drilling Costs by J. L. Lummus, D. B. Anderson and J. E. Fox starting on page 68 of "World Oil" for Feb. 1, 1962. The figure appears on page 71 of the article and illustrates actual field experience with the vinyl acetate-maleic anhydride polymer. The advantage of a polymer which would make possible maintaining even lower solids contents than those shown in the drawing will be apparent. The volume percents in the drawing should be multiplied by about 2.5 for comparison to weight percent values.

Agents are known which are more effective than the vinyl acetate-maleic anhydride copolymer for beneficiating bentonite. Other agents are known which are more effective than the vinyl acetate-maleic anhydride copolymer for flocculating clays. This copolymer, however, has stood virtually alone in its ability to perform both functions in an effective manner. Success of the copolymer has encouraged a search for other polymers exhibiting the dual function to a degree equal to that of the vinyl acetate-maleic anhydride copolymer. The existence of polymers exhibiting either a greater beneficiating or flocculating action has encouraged the hope that a polymer might even be found which could perform both functions better than the vinyl acetate-maleic anhydride copolymer. Such a polymer would permit use of a lower solids content with all the advantages shown in the drawing.

An object of this invention is to provide an additive for increasing the viscosity of water. An object of this invention is to provide a drilling fluid with a low colloidal solids content which includes bentonite and an agent which beneficiates the bentonite while flocculating other clays. A more specific object is to provide a drilling fluid containing bentonite and an agent which performs both functions to a degree greater than the vinyl acetate-maleic anhydride copolymer which is now in widespread use. Still another object is to provide a method for drilling at an increased rate.

In general, we accomplish the objects of our invention by using in a low solids drilling fluid a very low concentration of a copolymer of acrylic acid and acrylamide. Both the concentration of this copolymer and the acid-to-amide ratio are important. The molecular weight is not nearly so critical. The copolymer is ordinarily used as the sodium salt. Any water-soluble salt should be satisfactory, however.

The concentration of the acrylate-acrylamide copolymer should be at least about 0.005, but not more than about .15 pound per barrel (42 U.S. gallons). Preferably the concentration should be between about 0.02 and about 0.05 pound per barrel. The acrylate-to-acrylamide mol ratio may vary between about 12 to 88 and about 70 to 30. Preferably, the ratio should be about 50 to 50. The molecular weight may be such that a 1 percent by weight sollution in distilled water will have a viscosity at 20° C. of from about 2,000 to about 20,000 centipoises as measured by a Brookfield viscosimeter rotating at 6 r.p.m. A number 2 spindle should be used below 5000 centipoises, a number 3 spindle between 5000 and 20,000, and a number 4 spindle above 20,000 centipoises. The preferred range depends to some extent on the exact function which is preferred. For general use, however, a polymer having a molecular weight sufficient to give about a 15,000 centipoise viscosity has been found to be very advantageous.

One advantage of the acrylate-acrylamide copolymers is that an unusually low concentration is required due to their exceptionally great effectiveness. This reduces the cost of polymer which is required. The principal advantage lies in the possibility of using a smaller amount of bentonite. Actually, the bentonite concentration in one barrel of mud can be reduced into the range from 10 to 7 pounds per barrel using the subject polymer rather than the vinyl acetate-maleic anhydride copolymer. This increases the drilling rate since drilling rate depends to a large degree on the concentration of dispersed clay solids in the drilling fluid. The decreased clay solids content also permits operating in the very advantageous region which is below 3 percent solids as shown in the figure.

Because of the great effectiveness of the polymer, certan difficulties are possible. For example, it is not only desirable but necessary that the sodium bentonite content of the drilling fluid be less than about 4 percent. Otherwise the yield value or initial gel strength of the drilling fluid will be too great to permit settling of bit cuttings in the mud pits and the low solids content of the mud cannot be maintained.

When clay in a drilling fluid becomes flocculated by some agents, a high gel strength sometimes results. The acrylate-acrylamide copolymers may cause this result. Thus, if native clay becomes dispersed in the drilling fluid and is then flocculated by the polymer, it is possible under some conditions for the gel strength to reach values which will not permit proper settling of bit cuttings. Fortunately, drilling fluids containing our polymers are susceptible to treatment by thinning agents such as caustic and quebracho and complex lignosulfonates. Therefore, for drilling fluids containing as much as 3 percent bentonite and 3 percent low yield clays, it is possible to treat the gel strength back with thinners to a point where settling of bit cuttings in the mud pits will take place. Again it is obviously important that the bentonite content be kept low. In addition, the native clay content should also be kept as low as possible, particularly when drilling at fast rates in shale and clay formations.

The polymers flocculate native clays by becoming attached to these clays. Therefore, as the native clays are precipitated and lost from the mud system in the mud pits, some of the polymer is lost with the native clay. For this reason the copolymer must be added to the drilling fluid occasionally, usually about once a day. The amount and frequency of addition depends principally upon the rate of drilling. When drilling at high rates the amount and frequency of addition of the copolymer should be increased. Some makeup addition of bentonite is also required to compensate for losses at the shale shaker in jetting the mud pits and the like. The amounts of bentonite and polymer to be added can best be determined by measuring the properties of the drilling fluid. Again it should be emphasized that, due to the great effectiveness of the polymer, the amounts of bentonite and polymer should be kept low, overtreating being carefully avoided. It is usually advisable to use as little bentonite as possible to obtain the advantages shown in the drawing.

Our invention will be better understood by reference to the following examples. Suspensions of sodium bentonite in water were prepared containing various concentrations of bentonite. These were permitted to stand 16 hours before use. Aqueous solutions containing 1 percent by weight of various polymers were prepared. Mixtures were prepared, each mixture containing 5 milliliters of a polymer solution and 350 milliliters of a bentonite suspension. Viscosities were measured for each mixture with a Fann direct reading viscosimeter at 600 and at 300 r.p.m. From the data, the yield in barrels per ton was calculated based on apparent viscosity of 15 centipoises (600 reading divided by 2) and on plastic viscosity of 10 centipoises (600 reading minus 300 reading). The results are presented in Table I. These show the abilities of the various polymers to beneficiate bentonite.

Also presented in Table I are the results of tests designed to show the abilities of the polymers to flocculate other clays. These results were obtained by preparing an aqueous suspension containing 4 percent by weight of low yield clay (Rev Dust). A mixture of 99 milliliters of this suspension and 1 milliliter of the 1 percent polymer solution to be tested was prepared in a 100 milliliter graduated cylinder by shaking the suspension and solution together in the cylinder for about 60 seconds. The cylinder was then set upright and the time in seconds was recorded for the interface between the clear solution and suspension to reach the 50 milliliter mark on the cylinder.

TABLE I

| Test No. | Material | Yield Test, bbls. mud/ton bentonite | | Low Yield Clay Settling Time, sec. |
|---|---|---|---|---|
| | | Plastic Visc. Basis | Apparent Visc. Basis | |
| 1 | Calcium Salt, Vinyl Acetate-Maleic Anhydride. | 129.3 | 124.8 | 28 |
| 2 | Sodium Acrylate. Acrylamide, mole ratio 5:95. | 111.9 | 110.4 | 24 |
| 3 | Same as 2, mole ratio 10:90. | 116.3 | 116.3 | 23 |
| 4 | Same as 2, mole ratio 15:85. | 135.6 | 147.8 | 16 |
| 5 | Same as 2, mole ratio 30:70. | 123.5 | 121.7 | 14 |
| 6 | Same as 2, mole ratio 40:60. | 126.0 | 140.0 | 25 |
| 7 | Same as 2, mole ratio 50:50. | 130.0 | 156.0 | 16 |
| 8 | Same as 2, mole ratio 60:40. | 169.0 | 202.3 | 16 |
| 9 | Ethylene-Maleic Anhydride. | 140.0 | 177.3 | 88 |
| 10 | Guar Gum | 91.6 | 95.6 | 32 |
| 11 | Cationic Polymer | 89.3 | 87.4 | 25 |
| 12 | do | 102.3 | 93.2 | 140 |

In Table I the first test gives the performance of the successful commercial product for purposes of comparison. Tests 2 through 8 present the performance of acrylate-acrylamide copolymers of increasing ratio of acrylate to acrylamide. It will be apparent that all are quite good, some being better than others. Some are even quite obviously more effective as both bentonite beneficiating agents and as flocculating agents for other clays than the polymer of test 1. It was previously known that the slightly hydrolyzed acrylamide polymers of tests 2 and 3 were effective. These are described and claimed in U.S. Patent 3,081,260 to Park. It was also previously known that the more highly hydrolyzed acrylamide polymers (those having a higher acrylate-to-acrylamide ratio) had some utility in high concentrations in high solids drilling fluids as fluid loss reducers. This use is described in U.S. 2,775,557 to Morgan. The Morgan patent, incidentally, serves as a good source of information on methods of preparing these polymers. It was not previously known, however, that by observing strict upper limits on the concentrations of both bentonite and polymer, these more highly hydrolyzed polyacrylamides could be made to perform the dual function of beneficiating bentonite while flocculating other clays even better than the highly successful vinyl-maleic copolymers. The improved flocculating ability helps in maintaining the native solids content of the drilling fluid low and thus helps maintain the total clay solids content in the desired low range below about 3 percent.

The results of test 8 deserve particular comment. The material used in this test seems superior to all others on the basis of the tests reported in Table I. As will be shown in Table II, however, this polymer does not produce a drilling fluid with quite as low a fluid loss as some of the others. Therefore, the polymer of test 7 is preferred for most purposes.

In test 9 an ethylene maleic anhydride copolymer is shown to provide excellent bentonite beneficiation, actually better than in test 1, but the polymer is not a very good flocculant for other clays.

Tests 10 and 11 show that a natural gum and a synthetic cationic polymer gave surprisingly good flocculating action on native clays, but provided very little bentonite beneficiation. This means that with these polymers, so much bentonite must be used to provide the required viscosity, gel, and fluid loss properties, that the clay solids content is in the range around 5 percent or more. As shown in the drawing, much of the advantages of low solids muds are lost when the clay content reaches this range.

Test 12 shows that another cationinc polymer had very little beneficiating action on bentonite and also rather poor flocculating action on other clays. Many other materials were tested, but those reported in Table I seem representative and demonstrate the rather highly empirical and unpredictable nature of polymers when used to perform the desired dual function, and that those with an acrylate-to-acrylamide ratio of about 50 to 50 or 60 to 40 seem preferable. Further tests were made to determine the properties of drilling fluids prepared with these two polymers in various concentrations with various amounts of bentonite. The results are reported in Table II.

was 16.5. In tests 10 and 11 low concentrations of the 60:40 polymer actually increased the fluid loss. Higher polymer concentrations produced small decreases. The 50:50 polymer performed better in this regard, although the lowest concentration of 0.01 pound per barrel did cause a small increase in fluid loss. It should be noted that the viscosity, yield value, and gel strength in tests 10 to 17 are all within desirable ranges. Therefore, it may be advisable in many cases to tolerate the relatively high fluid loss values in order to take advantage of the other

TABLE II

| Test | Bent., wt. percent | Additive | | Plastic Visc., cpse. | Yield Value, lb./100 sq. ft. | Gel Strength, grams | | Fluid Loss, ml./30 min. |
|---|---|---|---|---|---|---|---|---|
| | | Conc., lb./bbl. | Ratio* | | | 10 sec. | 10 min. | |
| 1 | 4 | .01 | 60:40 | 7.5 | 26.5 | 19 | 32 | 18.0 |
| 2 | 4 | .02 | 60:40 | 8 | 45 | 27 | 36 | 17.5 |
| 3 | 4 | .05 | 60:40 | 10 | 61 | 33 | 70 | 15.0 |
| 4 | 4 | .10 | 60:40 | 15 | 45 | 27 | 122 | 12.0 |
| 5 | 4 | .01 | 50:50 | 7 | 26 | 17 | 29 | 16.0 |
| 6 | 4 | .02 | 50:50 | 7 | 38 | 25 | 45 | 15.5 |
| 7 | 4 | .05 | 50:50 | 11 | 33 | 17 | 71 | 12.5 |
| 8 | 4 | .10 | 50:50 | 14 | 25 | 17 | 92 | 11.5 |
| 9 | 3 | .00 | 50:50 | 3 | 1 | 0 | 0 | 16.5 |
| 10 | 3 | .01 | 60:40 | 6 | 15 | 7 | 12 | 19.0 |
| 11 | 3 | .02 | 60:40 | 7 | 19 | 8 | 20 | 19.5 |
| 12 | 3 | .05 | 60:40 | 9 | 20 | 8 | 32 | 15.5 |
| 13 | 3 | .10 | 60:40 | 10 | 13 | 7 | 46 | 12.5 |
| 14 | 3 | .01 | 50:50 | 5 | 11 | 5 | 11 | 18.5 |
| 15 | 3 | .02 | 50:50 | 7 | 12 | 5 | 17 | 16.5 |
| 16 | 3 | .05 | 50:50 | 8 | 11 | 5 | 36 | 13.5 |
| 17 | 3 | .10 | 50:50 | 8 | 11 | 5 | 38 | 11.5 |
| 18 | 2 | .00 | 50:50 | 1.5 | 0.5 | 0 | 0 | 31.0 |
| 19 | 2 | .01 | 60:40 | 5 | 5 | 3 | 3 | 31.0 |
| 20 | 2 | .02 | 60:40 | 5 | 5 | 3 | 6 | 29.0 |
| 21 | 2 | .05 | 60:40 | 5.5 | 6 | 3 | 12 | 20.0 |
| 22 | 2 | .10 | 60:40 | 5 | 4 | 1 | 12 | 16.0 |
| 23 | 2 | .01 | 50:50 | 4 | 3 | 2 | 5 | 24.0 |
| 24 | 2 | .02 | 50:50 | 3 | 2.5 | 1 | 6 | 21.0 |
| 25 | 2 | .05 | 50:50 | 3.5 | 2.5 | 1 | 9 | 16.5 |
| 26 | 2 | .10 | 50:50 | 4 | 3.5 | 1 | 10 | 15.0 |

*Acrylate to acrylamide ratio.

In tests 1 to 4 it is apparent that the yield value is above the upper limit of about 22 and the 10 second gel strength is above the upper limit of about 17, which are usually considered necessary to observe if bit cuttings are to settle effectively in the mud pits. Both the yield value and gel strength can be reduced to levels within operating limits by the use of thinners. It will be apparent, however, that the use of less than 4 percent sodium bentonite, even with very low concentrations of the 60:40 polymer, is advisable.

Tests 5 to 8 show the 50:50 polymer is much more nearly usable with 4 percent bentonite than the 60:40 polymer. A small amount of thinner makes these compositions usable as long as the native clay content can be maintained at very low values. Again, however, the use of less than 4 percent bentonite is obviously desirable.

A comparison of fluid loss values in tests 1 to 4 to those in tests 5 to 8 shows the better fluid loss properties obtained by use of the 50:50 polymer. This property is particularly well shown in tests 9 to 17 using 3 percent bentonite. In test 9 no polymer was added. The fluid loss properties. As will be shown later, the fluid loss can be reduced by including a little oil in the composition.

The rather extraordinary performances of the polymers in 2 percent bentonite slurries are shown in tests 18 to 26. Again, the 50:50 polymer is superior to the 60:40 polymer in fluid loss reduction, but both provide surprisingly good properties for such a low bentonite content. It will be apparent that in some cases even less bentonite can be used. Use of less than about 1 percent bentonite ordinarily is not desirable, however, in spite of the advantages of using as low a concentration as possible. The principal reason is that the bentonite tends to settle out at lower concentrations. It is not flocculated, but neither is it sufficiently dispersed to remain as well suspended as desired in the absence of greater agitation than is available in some mud pits.

Several acrylate-acrylamide copolymers having a 50:50 mole ratio, but polymerized to different degrees, were tested to determine molecular weight limits. Results are recorded in Table III. In all cases the polymer concentration was 0.02 pound per barrel.

TABLE III

| Test | Bent., wt. percent | Polymer Viscosity* | Plastic Visc., cpse. | Yield Value, lb./100 sq. ft. | Gel Strength, grams | | Fluid Loss ml./30 min. |
|---|---|---|---|---|---|---|---|
| | | | | | 10 sec. | 10 min. | |
| 1 | 2 | 15,000 | 4 | 2 | 1 | 5 | |
| 2 | 3 | 15,000 | 6 | 15 | 6 | 15 | 17.0 |
| 3 | 4 | 15,000 | 9 | 32 | 16 | 26 | 13.5 |
| 4 | 2 | 9,000 | 3 | 2.5 | 0.5 | 4 | 20.5 |
| 5 | 3 | 9,000 | 6 | 13 | 6 | 16 | 17.5 |
| 6 | 4 | 9,000 | 9 | 41 | 15 | 18 | 14.0 |
| 7 | 2 | 7,100 | 3.5 | 3 | 1 | 4 | 22.5 |
| 8 | 3 | 7,100 | 7 | 14 | 6 | 12 | 17.5 |
| 9 | 4 | 7,100 | 8 | 32 | 15 | 22 | 14.5 |
| 10 | 2 | 3,600 | 3.5 | 5 | 2 | 4 | 21.5 |
| 11 | 3 | 3,600 | 7 | 14 | 7 | 10 | 17.0 |
| 12 | 4 | 3,600 | 9 | 36 | 18 | 18 | 13.0 |

*Vicosity in centipoises of a 1 percent by weight aqueous solution measured at 20° C. by a Brookfield viscosimeter under conditions previously described.

An examination of the results reported in Table III shows that all the polymers within the range tested had about the same effects on bentonite regardless of molecular weight. The four polymers were also checked to determine relative bentonite beneficiating ability as well as flocculating effects on other clays. Again, all were quite similar except that the lowest molecular weight material seemed slightly superior in both respects.

A 2 percent bentonits slurry was treated first with the 50:50 polymer then with low yield clay similar to most native clays encountered in drilling, then with oil, and finally with caustic and quebracho to simulate field preparation, use, and treatment of the drilling fluid. Results are presented in Table IV. The tests were repeated using a 3 percent bentonite slurry. These results are also presented in Table IV.

initial gel of such a salt-saturated system are usually a little high and must be treated back with thinners. The polyacrylates should be those described in U.S. Patent 2,552,775 or U.S. Patent 2,718,497.

Gypsum also increased the fluid loss, but not as much as salt. Therefore, drilling fluids containing bentonite and our copolymer can be used to drill gyp beds or stringers if a slightly high fluid loss is not objectionable. If the fluid loss is objectionable and polyacrylates are added to decrease the fluid loss, then sodium sulfate should also be added. This combination of polyacrylates and sodium sulfate is further described and claimed in U.S. patent application S.N. 158,588 filed by Jones and Ryals on Dec. 11, 1961, now abandoned.

An important relationship between calcium ion concentration and bentonite concentration has been noted.

TABLE IV

| Test | Bentonite, wt. percent | Low Yield Clay, percent | Oil percent | Caustic and Quebracho, lb./bbl. | Plastic Visc., cpse. | Yield Value, lb./100 sq. ft. | Gel Strength, grams | | Fluid Loss, ml./30 min. |
|---|---|---|---|---|---|---|---|---|---|
| | | | | | | | 10 sec. | 10 min. | |
| 1 | 2 | | | | 4 | 3 | 1 | 6 | 16.0 |
| 2 | 2 | 3 | | | 5 | 9 | 5 | 18 | 19.0 |
| 3 | 2 | 3 | 10 | | 5 | 9 | 5 | 18 | 12.0 |
| 4 | 2 | 3 | 10 | *.2 | 5 | 9 | 5 | 22 | 11.0 |
| 5 | 3 | | | | 8 | 11 | 6 | 35 | 13.0 |
| 6 | 3 | 3 | | | 6 | 43 | 29 | 55 | 15.0 |
| 7 | 3 | 3 | 10 | | 6 | 43 | 32 | 62 | 11.0 |
| 8 | 3 | 3 | 10 | .2 | 8 | 29 | 21 | 45 | 10.0 |
| 9 | 3 | 3 | 10 | .4 | 9 | 23 | 20 | 50 | |
| 10 | 3 | 3 | 10 | .6 | 9 | 15 | 16 | 45 | 8.0 |

*0.2 lb./bbl. of caustic and 0.2 lb./bbl. of quebracho.

The concentration of the polymer in all cases was .05 pound per barrel. Thus, the results of tests 1 and 5 in Table IV are comparable to those of tests 25 and 16, respectively, in Table II. Tests 2 and 6 in Table IV show the effects of native clays on the drilling fluid. A rather sharp increase in yield value and gel strength occurred in both cases. In the 2 percent bentonite mud the increase was not serious since the yield value and initial gel strength remained within satisfactory limits. In the case of the 3 percent bentonite mud, however, the yield value and initial gel strength became excessive. The other effect of low yield clays was to increase the fluid loss values. This seems characteristic of muds containing polymer-beneficiated bentonite. Tests 3 and 7 show that oil provides a considerable decrease in fluid loss without greatly affecting other properties. Tests 4 and 8 to 10 show that caustic and quebracho further lowered the fluid loss. This is thought to be due to the ability of these agents to disperse the oil into smaller and more numerous droplets. The principal value of the caustic and quebracho, however, was to decrease excessive yield values and initial gel strength. It will be observed that in test 10 the yield value and initial gel strength were brought down to usable levels.

The effects were determined of salt and gysum on a drilling fluid containing bentonite beneficiated with the preferred acrylate-acrylamide copolymer. This particular drilling fluid had a fluid loss of 23 milliliters in 30 minutes in the absence of salt. The addition of 4 percent sodium chloride (40,000 parts per million) increased the fluid loss to 60 milliliters. In some areas this is considered too high for use. In others, however, the high fluid loss is not considered objectionable. The fluid loss can be decreased by the addition of sodium polyacrylates. About 0.5 to 1.0 pound per barrel of drilling fluid of the polyacrylate will decrease the fluid loss to a value less than 20 without greatly affecting other drilling fluid properties. With the polyacrylate present the salt concentration can be further increased, the fluid loss rising to only about 40 milliliters in saturated salt solution in the presence of about 0.75 pound per barrel of polyacrylate. The yield value and As is well known, calcium ion tends to flocculate aqueous dispersions of sodium bentonite. When the calcium ion concentration is more than about 500 parts per million and the bentonite concentration is less than about one percent, our polymer aids in flocculating bentonite to a sufficient extent that the bentonite will settle out rapidly in the mud pits. If the calcium ion concentration is smaller or the bentonite concentration is higher, some flocculation still takes place; but the bentonite can be kept dispersed by a little agitation. At a bentonite concentration in the preferred range from about 2 to 3 percent (about 7 to 10 pounds per barrel) and in the presence of lower calcium ion concentrations, the results reported above with gypsum can be expected. The presence of calcium is ordinarily a disadvantage, and its effects should be combated by use of polyacrylates and sodium sulfate as described above, or by using soda ash. Under at least one condition, however, the effects of calcium ion can be a distinct advantage. This is where it is desired to drill first with clear water and add bentonite only when the well reaches a considerable depth. The principal problem appears where the drilled formations contain bentonite.

An example of such a situation occurred during one of the first field tests of the polymer. This was in an area where the formations were known to contain some bentonite. Our polymer was added to the water used for drilling the well. No bentonite was added, the purpose of the polymer being simply to prevent dispersions of bit cuttings and to flocculate those which were dispersed. In this way clear water was to be maintained and the highest drilling rate possible was to be achieved. It was noted after a period of drilling, however, that the water was not as clear as desired. Analysis of the drilling fluid showed it contained about 2 pounds per barrel (about 0.6 percent) of high-yield clay. X-ray diffraction analysis showed the clay contained montmorillonite, a class of clay of which bentonite is a member. Calcium content of the water had been varying between about 100 and 200 parts per million, this calcium coming from formations drilled and from makeup water. The addition of about another 200 or 300 parts per million of calcium ion in the form of calcium chloride caused the flocculation to increase in the presence of our polymer until substantially clear water was available at the mud pump intake.

At the time the calcium chloride was added, the well was close to the depth where mudding up was planned so the addition of the calcium chloride was continued for only a short time. The next day after the addition of calcium chloride was discontinued, mudding up with about 3 percent bentonite took place without difficulty. This shows that calcium can be added to cooperate with our polymer in obtaining clear water even when bentonite is present in the drilled formations. It also shows that mudding up can be accomplished without difficulty by discontinuing the addition of calcium shortly before the mudding-up operation. It may be advisable in some cases to add soda ash or dilute the mud system in order to reduce the calcium ion concentration still farther before mudding up.

Samples of the muddy water from this well before calcium chloride was added were brought into the laboratory and checked to determine how much calcium was required. The results are reported in Table V. In the tests reported the procedure was the same as described in connection with Table I, except that only 0.5 milliliter of the one percent polymer solution was added in each case since the drilling fluid already contained some polymer.

TABLE V

| Test | Polymer | Settling Time, sec., with added calcium ion shown | | | | |
|---|---|---|---|---|---|---|
| | | 0 | 100 p.p.m. | 200 p.p.m. | 500 p.p.m. | 1,000 p.p.m. |
| 1 | Sodium Acrylate-Acrylamide, mole ratio 50:50. | *n.f. | 115 | 70 | 13 | 16 |
| 2 | Same as 1, mole ratio 10:90. | 170 | 100 | 90 | 400 | †l.f. |
| 3 | Calcium Salt, Vinyl Acetate-Maleic Anhydride. | *n.f. | *n.f. | *n.f. | *n.f. | *n.f. |

*n.f.—Not flocculated.
†l.f.—Large flocs. Could not obtain accurate reading.

It will be obvious from Test 1 of Table V that the addition of 500 parts per million calcium ion produced excellent flocculation. It will be recalled that this field mud already contained about 100 or 200 parts per million of calcium ion so best results were obtained in the presence of at least about 600 to 700 parts per million of calcium ion. In the actual field test, however, the presence of only about 500 parts per million was sufficient to provide clear water. This would correspond with about 200 parts per million of added calcium ion in Table V indicating that a settling rate of about 70 seconds was adequate for field purposes.

Test 2 of Table V shows that the low ratio acrylate-acrylamide polymer flocculated the low concentration of clay at all calcium concentrations tested although the settling rate was rather slow in most cases. The particular vinyl-maleic polymer tested did not flocculate the clay at any calcium concentrations.

The tests were repeated using the drilling fluid diluted with an equal volume of distilled water. Results are presented in Table VI.

TABLE VI

| Test | Polymer | Settling Time, sec., with added calcium ion shown | |
|---|---|---|---|
| | | 0 | 500 p.p.m. |
| 1 | Sodium Acrylate-Acrylamide, mole ratio 50:50. | No Flocculation | Less than 10. |
| 2 | Same as 1, mole ratio 10:90. | 11 | 21. |
| 3 | Calcium Salt, Vinyl Acetate-Maleic Anhydride. | No Flocculation | 400+. |

The tests in Table VI show that with less clay present more rapid settling occurred in the presence of calcium. Even the vinyl-maleic polymer appeared to provide a small amount of flocculation and a slow rate of settling.

Additional tests were conducted with a slurry of 0.5 percent by weight bentonite in distilled water. The results are reported in Table VII. Only 0.5 milliliters of one percent solution was added in these tests to make them comparable to the tests reported in Tables VI and VII, even though no polymer was already present in the bentonite slurry.

TABLE VII

| Test | Polymer | Settling Time, Sec., with added calcium ion shown | | | |
|---|---|---|---|---|---|
| | | 0 | 500 p.p.m. | 1,000 p.p.m. | 2,000 p.p.m. |
| 1 | Sodium Acrylate-Acrylamide, mole ratio 50:50. | *n.f. | 120 | 70 | 100 |
| 2 | Same as 1, mole ratio 50:50. | 300 | 70 | 70 | |
| 3 | Calcium Salt, Vinyl Acetate-Maleic Anhydride. | *n.f. | *n.f. | *n.f. | |

*n.f.—No flocculation.

The results in Table VII seem to indicate either that a larger amount of polymer should have been used, or that at least part of the 0.6 percent clay in the natural mud was not bentonite since the results in Table VII are characteristic of what might be expected of a natural mud with more clay or less polymer. It can be concluded that if clear water is to be maintained by the addition of calcium ion and our polymer, the clay content of the drilling fluid should not be permitted to build up too high before treatment is started.

As previously noted, the flocculating action seems to depend upon attachment of the polymer to the surfaces of bit cuttings and this causes loss of some of the polymer with the bit cuttings. Some of the better flocculating agents become attached to clay particles in such large volumes that they are rapidly lost from the drilling fluid. One of the principal advantages of the vinyl acetate-maleic anhydride copolymer now in commercial use is that this copolymer is lost so slowly from the drilling fluid that it needs to be added only once or twice a day. A test was made to compare the abilities of the vinyl acetate-maleic anhydride copolymer and the acrylate-acrylamide copolymer to stay in the drilling fluid and maintain good properties while shale was being added. The shale was ground to offer a greater surface area. The technique was to mix in 5 pounds of the shale per barrel of drilling fluid, allow the shale to settle out, and then measure the properties of the drilling fluid. Then another 5 pounds of shale were added, mixing was repeated, the mud was allowed to stand for 48 hours to allow adsorption of the polymer on the shale, and the drilling fluid properties were again measured. The steps of adding more shale, mixing, allowing to stand, and measuring properties were repeated until 25 pounds of shale had been added per barrel of drilling fluid. The beginning and final properties are presented in Table VIII.

TABLE VIII

| Test | Polymer | Shale lb./bbl. | Plastic Visc., cpse. | Yield Value, lb./100 sq. ft. | Gel Strength, grams | |
|---|---|---|---|---|---|---|
| | | | | | 10 sec. | 10 min. |
| 1 | Vinyl Acetate-Maleic Anhydride. | 0 | 7 | 6 | 2 | 4 |
| 2 | ----do---- | 25 | 8.5 | 9.5 | 7 | 10 |
| 3 | Acrylate-Acrylamide | 0 | 9 | 4 | 3 | 7 |
| 4 | ----do---- | 25 | 10 | 7.5 | 3 | 6 |

It will be apparent from the results reported in Table VIII that the properties of the acrylate-acrylamide drilling fluid remained even more constant than the vinyl acetate-maleic anhydride mud. Thus, it would seem that use of a smaller amount of the acrylate acrylamide polymer should last as long as a larger amount of the other polymer. This is fortunate since, as previously noted, the concentration of the acrylate-acrylamide polymer should be limited to low values to avoid undesirable effects of overtreating.

When the term "consisting essentially of" is used herein, it will be understood that the term is intended to indicate the named ingredients of a composition plus other materials of a nature and in such amounts as will not substantially adversely affect the properties of the composition for its intended purposes, for example, in the case of a drilling fluid consisting essentially of water, bentonite, and the polymer, the composition may also include drilled solids, weighting agents, oil, treating chemicals such as caustic and quebracho, or other materials commonly found in or added to drilling fluids.

While the invention has been described in connection with drilling fluids, it will be apparent that other applications are possible. These include any use in which beneficiated bentonite might be advantageous, for example, the beneficiated bentonite may be used in a fracturing liquid to decrease loss of the liquid to the fracture faces. The principal advantage is that less bentonite solids are left in the fracture to impede flow of liquids through the fracture to the well. Beneficiated bentonite may also be used to make dams, irrigation ditches, and the like more impermeable.

The bentonite and polymer may be added to the water separately or may be premixed before adding to the water. In the second case the weight ratio of bentonite to polymer may vary from about 2,000 to 1 to about 20 to 1, but should preferably be between about 100 to 1 and about 500 to 1.

We claim:

1. A low solids drilling fluid consisting essentially of water, from about 1 to about 4 percent by weight of sodium bentonite, not more than about 3 percent by weight of other clays, not more than about 500 parts per million of calcium ion, and from about 0.005 to about 0.15 pound per barrel of said drilling fluid of a water-soluble salt of an acrylic acid-acrylamide copolymer, the mole ratio of acrylate to acrylamide being between about 12 to 88 and about 70 to 30, and said copolymer being polymerized to such a degree that a 1 percent by weight solution in distilled water has a viscosity of between about 2,000 and about 20,000 centipoises as measured with a Brookfield viscosimeter at 20° C. rotating of 6 revolutions per minute using a number 2 spindle for viscosities up to 5000, a number 3 spindle between 5000 and 20,000, and a number 4 spindle above 20,000 centipoises.

2. The drilling fluid of claim 1 in which said salt of said copolymer is the sodium salt.

3. A method of drilling a well comprising operating a bit in the bottom of said well to drill the well deeper and thus produce bit cuttings and circulating in said well the drilling fluid of claim 2, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

4. The drilling fluid of claim 1 in which said salt of said copolymer is a sodium salt, said copolymer is polymerized to such a degree that a 1 percent by weight aqueous solution has a viscosity of about 15,000 centipoises, and in which the ratio of acrylate to acrylamide is about 50 to 50.

5. A method of drilling a well comprising operating a bit in the bottom of said well to drill the well deeper and thus produce bit cuttings and circulating in said well the drilling fluid of claim 4, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

6. A method of drilling a well comprising operating a bit in the bottom of said well to drill the well deeper and thus produce bit cuttings and circulating in said well the drilling fluid of claim 1, whereby a fast drilling rate is maintained due to the low solids content of the drilling fluid which results from flocculation of drilled clay solids, but the loss of the drilling fluid to porous formations penetrated by the well is maintained at a low value and sufficient viscosity is maintained to remove the bit cuttings from the well.

7. A method of drilling a well comprising first circulating in said well during the drilling operations a drilling fluid consisting essentially of water, at least about 500 parts per million of calcium ion, and from about 0.005 to about 0.15 pound per barrel of said drilling fluid of a water-soluble salt of an acrylic acid-acrylamide copolymer, the mole ratio of acrylate to acrylamide being between about 12 to 88 and about 70 to 30, and said copolymer being polymerized to such a degree that a 1 percent by weight solution in distilled water has a viscosity of between about 2,000 and about 20,000 centipoises as measured with a Brookfield viscosimeter at 20° C. rotating at 6 revolutions per minute using a number 2 spindle for viscosities up to 5000, a number 3 spindle between 5000 and 20,000, and a number 4 spindle above 20,000 centipoises; second, reducing the calcium content of said drilling fluid to a level below about 500 parts per million; and third, dispersing from about 1 to about 4 percent by weight of sodium bentonite into said drilling fluid and continuing circulation of the bentonite-containing slurry while continuing the drilling operations and maintaining the concentrations of said polymer in the range from about 0.005 to about 0.15 pounds per barrel and the concentration of bentonite between about 1 and about 4 percent by weight of said drilling fluid; whereby during the first part of the drilling operation all drilled clays, including bentonite, are flocculated, but in the final part of the drilling operation the bentonite is beneficiated while other clays are flocculated.

8. The method of claim 6 in which said salt of said copolymer is a sodium salt.

9. The method of claim 6 in which said salt of said copolymer is a sodium salt, said copolymer is polymerized to such a degree that a 1 percent by weight aqueous solution has a viscosity of about 15,000 centipoises, and in which the ratio of acrylate to acrylamide is about 50 to 50.

References Cited

UNITED STATES PATENTS

| | | | |
|---|---|---|---|
| 2,702,788 | 2/1955 | Dawson | 252—8.5 |
| 2,718,437 | 9/1955 | Oldham et al. | |
| 2,755,557 | 12/1956 | Morgan | 252—8.5 |
| 3,025,236 | 3/1962 | Barrett et al. | 252—8.5 |
| 3,070,543 | 12/1962 | Scott | 252—8.5 |
| 3,081,260 | 3/1963 | Park | 252—8.5 |

FOREIGN PATENTS

| | | |
|---|---|---|
| 725,460 | 3/1955 | Great Britain. |

OTHER REFERENCES

Scanley, C. S.: Acrylic Polymers as Drilling Mud Additives, in World Oil, 149(1), July 1959, pp. 122, 124, 126, 128, TN 860,041.

CHARLES E. O'CONNELL, *Primary Examiner.*

I. A. CALVERT, *Assistant Examiner.*